United States Patent
Atwood

(10) Patent No.: US 7,419,604 B1
(45) Date of Patent: Sep. 2, 2008

(54) USE OF BORON COMPOUNDS TO PRECIPITATE URANIUM FROM WATER

(75) Inventor: David A. Atwood, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 363 days.

(21) Appl. No.: 11/321,488

(22) Filed: Dec. 29, 2005

Related U.S. Application Data

(60) Provisional application No. 60/639,898, filed on Dec. 29, 2004.

(51) Int. Cl.
C02F 1/62 (2006.01)
C02F 101/20 (2006.01)

(52) U.S. Cl. .................. 210/725; 210/724; 210/727; 210/912; 423/11

(58) Field of Classification Search ............... 210/724
See application file for complete search history.

(56) References Cited

U.S. PATENT DOCUMENTS

| | | | |
|---|---|---|---|
| 4,059,670 A | 11/1977 | Kakihana et al. | |
| 4,193,853 A | 3/1980 | Childs et al. | |
| 4,247,522 A * | 1/1981 | Pyman et al. | 423/8 |
| 4,258,012 A * | 3/1981 | Barreiro et al. | 423/8 |
| 4,376,070 A | 3/1983 | Pope et al. | |
| 4,418,961 A | 12/1983 | Strom et al. | |
| 4,486,392 A * | 12/1984 | Heckmann et al. | 423/11 |
| 4,524,001 A * | 6/1985 | Joubert | 210/713 |
| 4,725,413 A * | 2/1988 | Heckmann et al. | 423/11 |
| 5,084,252 A * | 1/1992 | Cahill et al. | 423/16 |
| 5,273,725 A | 12/1993 | Carlson | |
| 5,531,970 A | 7/1996 | Carlson | |
| 5,949,084 A | 9/1999 | Schwartz | |
| 5,961,679 A | 10/1999 | Forsberg | |
| 5,976,383 A | 11/1999 | Guess et al. | |
| 2003/0132166 A1 | 7/2003 | Rey | |

* cited by examiner

*Primary Examiner*—Peter A. Hruskoci
(74) *Attorney, Agent, or Firm*—King & Schickli, PLLC

(57) ABSTRACT

A method is provided for removing uranium from water. The method includes the mixing of a boron reagent with water contaminated with uranyl dication ions, leading to removal of the uranium from that water.

17 Claims, 6 Drawing Sheets

USE OF BORON COMPOUNDS TO PRECIPITATE URANIUM FROM WATER

This application claims the benefit of U.S. Provisional Patent Application Ser. No. 60/639,898, filed Dec. 29, 2004, the disclosure of which is incorporated herein in its entirety by reference.

TECHNICAL FIELD

This invention relates generally to the remediation of aqueous uranium contamination and, more particularly, to a method for precipitating uranium from a source of water contaminated with the uranyl dication $[UO_2]^{2+}$.

BACKGROUND OF THE INVENTION

Over the past 50 years the United States has used nuclear energy for military purposes and power generation. This has resulted in the establishment of numerous facilities engaged in the production, research, development and testing of nuclear materials. Now the nation must deal with the environmental consequences of the radioactive materials that were generated.

Over forty million tons of soil and debris are contaminated with radioactive waste. This extends to about 1.7 trillion gallons of groundwater in some 5,700 distinct plumes. Hazardous and radioactive waste at more than 120 sites in 36 states and territories must be characterized, treated and disposed of.

Uranium exists in contaminated water and sediments as the highly water soluble uranyl dication $[UO_2]^{2+}$ ion. The uranyl dication is very mobile at these sites, able to travel in solution through the groundwater. Currently there are no techniques that will irreversibly bind the uranyl dication ion and prevent its dispersion in nature.

The present invention relates to the use of boron reagents to bind the uranium and precipitate it from the contaminated water. This allows, for example, the uranium to be collected in sludge ponds where it can be stored or collected for safe disposal or storage. Alternatively, the boron reagents may be used to precipitate the uranium on site and left in place. The precipitate that forms between the boron reagent and uranium will not release the uranium back into the water. Advantageously, the uranyl dication is effectively removed from the groundwater so that it cannot spread out into the environment. Thus, the present invention effectively prevents further environmental damage resulting from uranium contamination.

SUMMARY OF THE INVENTION

In accordance with the purposes of the present invention as described herein there is provided a method for removing uranium from water. The method may be broadly described as comprising the step of mixing a boron reagent with water contaminated with uranyl dication $[UO_2]^{2+}$ and precipitating uranium from that water.

In accordance with one aspect of the present invention borax (hydrated sodium borate) may be used as the boron reagent. By adjusting the pH of the contaminated water to about pH 4, the effectiveness of the borax in binding the uranyl dication and removing uranium from the water supply is enhanced.

In accordance with yet another aspect of the present invention boric acid may be used as the boron reagent. By adjusting the pH of the contaminated water to about pH 8, the binding action of the boric acid with the uranyl dication and precipitation of uranium is enhanced.

In accordance with still another aspect of the present invention a method is provided for removing uranium from contaminated groundwater. This method is defined as comprising adding a boron reagent to the contaminated groundwater to bind and precipitate uranium from the groundwater and collecting the precipitated uranium for safe disposal. That method may further include the step of adjusting the pH of the contaminated groundwater in order to further promote precipitation of uranium from the contaminated groundwater. Further, a surfactant may be added to the contaminated water to speed the process.

Other objects of the present invention will become apparent to those skilled in this art from the following description wherein there is shown and described preferred embodiments of this invention, simply by way of illustration of the modes currently best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrates several aspects of the present invention and, together with the description, serves to explain the principles of the invention. In the drawing.

Figure 1:
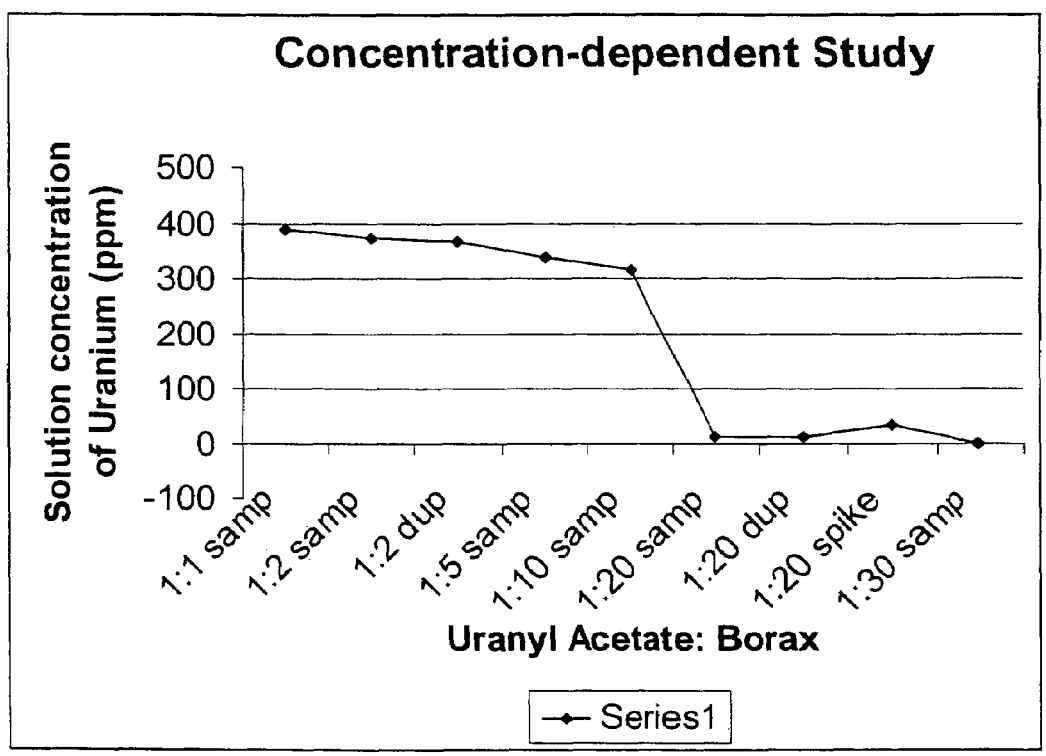
FIG. 1 graphically shows the results of a concentration-dependent study at various uranyl:borax ratios.

Reference will now be made in detail to the presently preferred embodiments of the invention, examples of which are illustrated in the accompanying drawings.

DETAILED DESCRIPTION OF THE INVENTION

As discussed above, the present invention relates to a method of removing uranium from water. This method is particularly useful for remediating aqueous uranium contamination from Department of Energy and other sites around the country. The method may be broadly described as comprising the mixing of a boron reagent with water contaminated with the uranyl dication $[UO_2]^{2+}$ and precipitating uranium from that water.

More specifically describing the invention the boron reagent may be selected from a group of reagents including borax, boric acid, similar sources of boron and mixtures thereof. In addition the method may include the step of adjusting the pH of the contaminated water in order to enhance the binding activity of the boron reagent and thereby increasing uranium precipitation. More specifically, by adjusting the pH of the contaminated water to about pH 4, the binding and precipitation activity of borax is enhanced. By adjusting the pH of the contaminated water to about pH 8, the binding and uranium precipitating activity of boric acid is enhanced. When borax and boric acid are both used in combination as the boron reagent, one may adjust the pH of the contaminated water from about pH 4 to about pH 8. This may be done by adding substantially any known bases or acids suitable for this purpose. For example, one could use common bases such as sodium hydroxide, potassium hydroxide or ammonium hydroxide to raise the pH of the contaminated water. Alternatively, one could use common acids such as hydrochloric acid, sulfuric acid, phosphoric acid or acetic acid to lower the pH of the contaminated water.

Further for some applications, it has been found that by adding surfactant to the contaminated water, the hydration energy of the uranyl ions is reduced and more rapid uranium precipitation results. A number of different surfactants may be utilized to achieve this result including but not limited to sodium dodecyl sulfate. Use of a surfactant and molar excess amounts of the boron reagent gives rapid precipitation of uranium from the contaminated water.

Advantageously, the exceptionally strong lattice energy resulting from the attraction between the doubly charged uranyl ion and the coordinating oxygens in the boron oligomer cause the resulting precipitated compounds to be extremely insoluble and impervious to leaching. Thus, the uranium is effectively removed from the water supply where it can be held in stable form in, for example, a sludge pond. The resulting precipitate may also be collected and removed from the site for safe disposal or storage at a selected location if desired. Alternatively, the boron reagent may be added to uranium contaminated water and the precipitate left in place.

The following examples are presented to further illustrate the invention, but it is not to be considered as limited thereto. Numerous modifications and variations will be apparent to those skilled in the art upon consideration of the present disclosure and upon practicing the invention.

EXAMPLE 1

Preparation of Uranyl Borax Precipitate at pH 4

100 mL of a 0.00957 M stock solution of uranyl diacetate was taken in an Erlenmeyer flask. The pH of the solution was 4. Meanwhile, 0.364 g of borax was dissolved in 100 mL of deionized water in a 100 mL volumetric flask. Subsequently, the borax solution was added to the uranyl solution. The resultant yellow solution gave a precipitate over one week. Precipitation increased over a period of 4 weeks.

Yield: 0.2442 g m. p.: >400° C.

IR/Raman: 3448, 1636, 1536, 1472, 1384, 1098, 1055, 932, 677, 610, 486

TGA: 40–180° C. (6.6%, 1.9 mg), 220–380° C. (1.8%, 0.5 mg), 640–710° C. (0.27%, 0.08 mg), 910–970° C. (0.67%, 0.19 mg)

XRD: not $UO_2(BO_2)_2$, $UO_2(CH_3COO)_2$, and not Borax

BET: 0.6286±0.0586 $m^2/g$ (non-porous coarse powder)

U content: (289.021 ppm/1000 ppm), B content: (41.53 ppm/1000 ppm)

EXAMPLE 2

Concentration-Dependent Study

A 0.00957M stock solution was prepared by dissolving 2.03 g of $UO_2(CH_3COO)_2$ in 500 mL of water. 50 mL aliquots of the stock solution were added to six centrifuge bottles with a 50 mL volumetric pipette. Meanwhile, stock solutions of Borax were prepared in 1:1, 1:2, 1:5, 1:10, 1:20 and 1:30 molar ratios. Subsequently, 200 mL of each stock solution was added to the six centrifuge bottles via a volumetric pipette (see Table 1). The mixtures were centrifuged at 18,592 G (gravity)/10,000 r.p.m. for 20 mins at 22° C.

TABLE 1

Composition of uranyl-borax solutions

| Uranyl Acetate: Borax | No. of moles of Borax required | Borax stock solutions | Weight of the Uranyl-Borax Solutions in 250 mL centrifuge bottles (g) |
|---|---|---|---|
| 0.0424 | $4.785 * 10^{-4}$ | 0.182 g/200 mL | 308.66 |
| 1:2 | $9.57 * 10^{-4}$ | 0.456 g/250 mL | 308.21 |
| 1:5 | $2.39 * 10^{-3}$ | 1.139 g/250 mL | 308.86 |
| 1:10 | $4.785 * 10^{-3}$ | 2.28 g/250 mL | 308.82 |
| 1:20 | $9.57 * 10^{-3}$ | 18.24 g/1 L | 308.54 |
| 1:30 | 0.01436 | 27.38 g/1 L | 308.61 |

The supernatants were decanted into 250 mL Erlenmeyer flasks. Supernatant uranium concentration was measured by inductively coupled plasma spectroscopy (ICP) using standard methods for examination of water and waste water (Standard Methods for the Examination of Water and Wastewater, $20^{th}$ Edition, Method 3210B—Metals by ICP/Atomic Emission Spectroscopy, the disclosure of which is incorporated herein by reference). Since only dissolved uranium was being observed, the digestion step was excluded. The results are summarized in Table 2, showing precipitation of uranium at various concentrations of boron reagent. This procedure demonstrated that a larger percentage of the aqueous uranium was precipitated with higher molar amounts of the boron reagent. Average uranium concentration is presented in graphical form in FIG. 1.

TABLE 2

Precipitation of uranium by borax

| Ratio of Uranyl Acetate: Borax | Uranium Conc. At λ = 263.553 (ppm) | Uranium Conc. At λ = 385.957 (ppm) | Uranium Conc. At λ = 409.013 (ppm) | Average Uranium Concentration (ppm) |
|---|---|---|---|---|
| 1:1 samp | 392.877 | 387.164 | 383.200 | 387.747 |
| 1:2 samp | 379.941 | 371.124 | 368.297 | 373.12067 |
| 1:2 dup | 375.707 | 365.359 | 361.386 | 367.484 |
| 1:5 | 348.107 | 334.459 | 333.147 | 338.571 |
| 1:10 | 326.299 | 310.853 | 309.733 | 315.62833 |
| 1:20 | 11.0958 | 9.91600 | 10.5373 | 10.516366 |
| 1:20 dup | 11.1401 | 10.0081 | 10.6351 | 10.594433 |
| 1:20 spike | 34.3048 | 32.7090 | 32.7087 | 33.240833 |
| 1:30 samp | −0.626774 | −1.45890 | −0.404018 | −0.8298966 |

EXAMPLE 3

Uranyl Acetate:Borax:Sodium Dodecyl Sulfate (Surfactant) Ratio Dependent Study A 0.00957M stock solution was prepared by dissolving 0.03 g of $UO_2(CH_3COO)_2$ in 500 mL of water. Aliquots of 10 mL were added to centrifuge bottles with a 10 mL pipette. Also, stock solutions of borax were prepared in 1:1 and 1:20 ratios. These were added to the centrifuge bottles in 30 mL aliquots, and were measured with a graduated cylinder. The sodium dodecyl sulfate solutions were prepared in 25 mL volumetric flasks in concentrations of 1:1, 1:2 and 1:20. Relative proportions of reagents are presented in Table 3.

TABLE 3

Composition of uranyl:borax:surfactant mixtures

| Uranium:<br>Borax:<br>Surfactant | No. of moles/L of<br>Uranyl Acetate | No. of moles/L of<br>Borax | No. of moles/L of<br>Sodium Dodecyl<br>Sulfate |
|---|---|---|---|
| 0.04236 | $9.57 \times 10^{-5}$ mol/0.010 L | $9.57 \times 10^{-5}$ mol/0.030 L | 0 mol/0.025 L |
| 1:1:1 | $9.57 \times 10^{-5}$ mol/0.010 L | $9.57 \times 10^{-5}$ mol/0.030 L | $9.536 \times 10^{-5}$/ 0.025 L |
| 1:1:2 | $9.57 \times 10^{-5}$ mol/0.010 L | $9.57 \times 10^{-5}$ mol/0.030 L | $1.914 \times 10^{-4}$/ 0.025 L |
| 1:20:1 | $9.57 \times 10^{-5}$ mol/0.010 L | $1.43 \times 10^{-3}$ mol/0.030 L | $9.536 \times 10^{-5}$/ 0.025 L |
| 1:1:20 | $9.57 \times 10^{-5}$ mol/0.010 L | $9.57 \times 10^{-5}$ mol/0.030 L | $1.907 \times 10^{-3}$/ 0.025 L |
| 1:20:20 | $9.57 \times 10^{-5}$ mol/0.010 L | $1.43 \times 10^{-3}$ mol/0.030 L | $1.907 \times 10^{-3}$/ 0.025 L |

The mixture was then centrifuged at 18,592 G (gravity)/10,000 r.p.m. for 20 min. at 22° C. The supernatants were decanted into digestion tubes, and 1.3 mL of antifoam A was added to each sample. The samples were then digested at 95° C. for 2 days with 500 µL Nitric Acid. Referring to Table 4, it can be seen that addition of surfactant improved uranium removal.

TABLE 4

Precipitation of uranium by borax in the presence of surfactant

| Uranyl Acetate:Borax:Sodium<br>Dodecyl Sulfate (Surfactant) Ratio | Uranium Concentration (ppm) |
|---|---|
| 1:1:1 | 302.138 |
| 1:1:20 | 247.952 |
| 1:1:20 dup | 229.491 |
| 1:1:20 trip | 244.242 |
| 1:20:20 | 100.898 |
| 1:20:20 dup | 101.063 |

This experimental procedure illustrates that surfactants can be used to improve the precipitation of uranium with lower amounts of the boron reagent. Additionally, this experiment demonstrates that boron reagents can be used to precipitate uranium in the presence of organic groups having the potential to bind uranium through their oxo groups and thereby compete with the B-U precipitation process.

EXAMPLE 4

Leaching Studies

A. Time-Dependent Leaching Study of Supernatants

A 0.00957 M stock solution was prepared by dissolving 2.03 g of $UO_2(CH_3COO)_2$ in 500 mL of water. 10 mL aliquots of the stock solution were pipetted out with a 10 mL volumetric pipette. The pH of the solutions were adjusted with 1M NaOH solution and then made up to 25 mL in a volumetric flask. The four pH conditions selected for the study were 4, 6, 8, and 10. Subsequently, the 25 mL solutions were taken in sample vials and 40 mL of 0.0478M [uranyl acetate:borax in a 1:20 ratio] and 40 mL of 0.0718M [uranyl acetate:borax in a 1:30 ratio] were added to the respective sample vials. All samples were centrifuged at 1500 G/2840 r.p.m. at 22° C. for 10 mins and decanted into digestion tubes.

Figure 2:
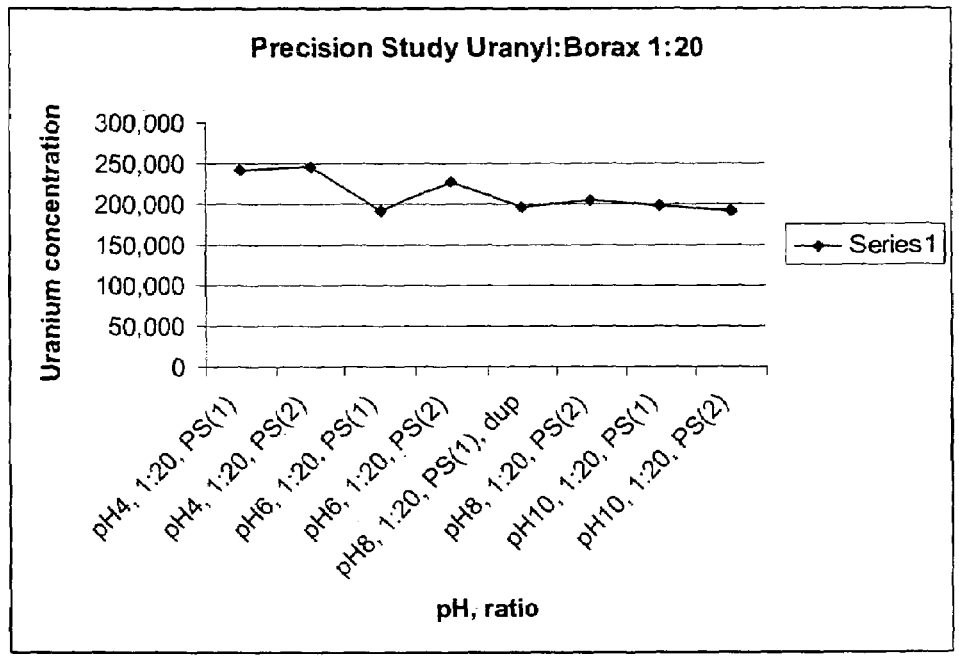
FIG. 2 graphically shows the results of a precision study at a uranyl:borax molar ratio of 1:20.
Figure 3:
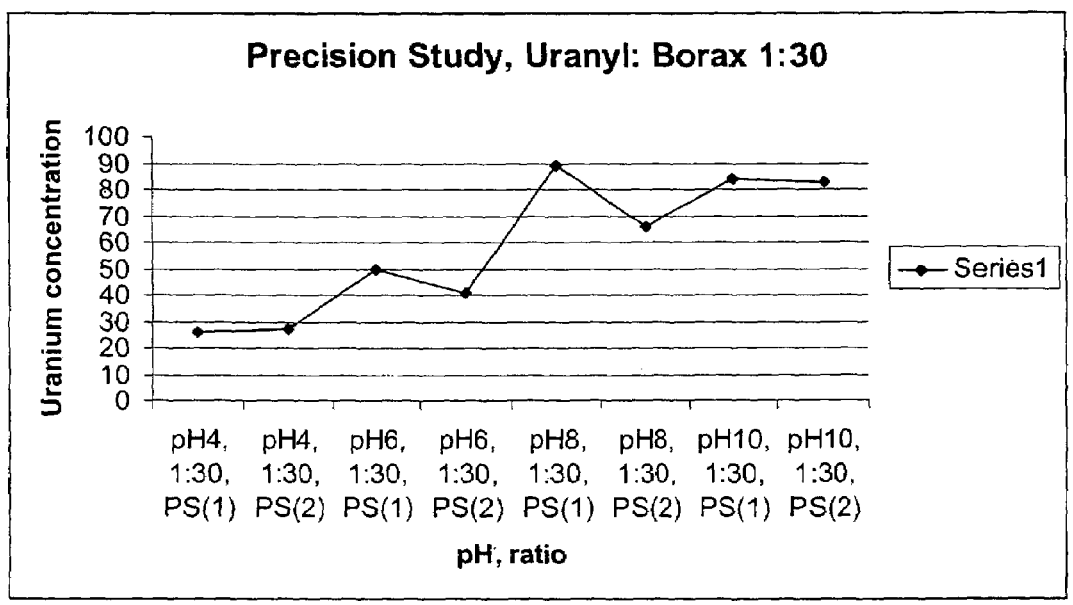
FIG. 3 graphically shows the results of a precision study at a uranyl:borax molar ratio of 1:30.
Figure 4:
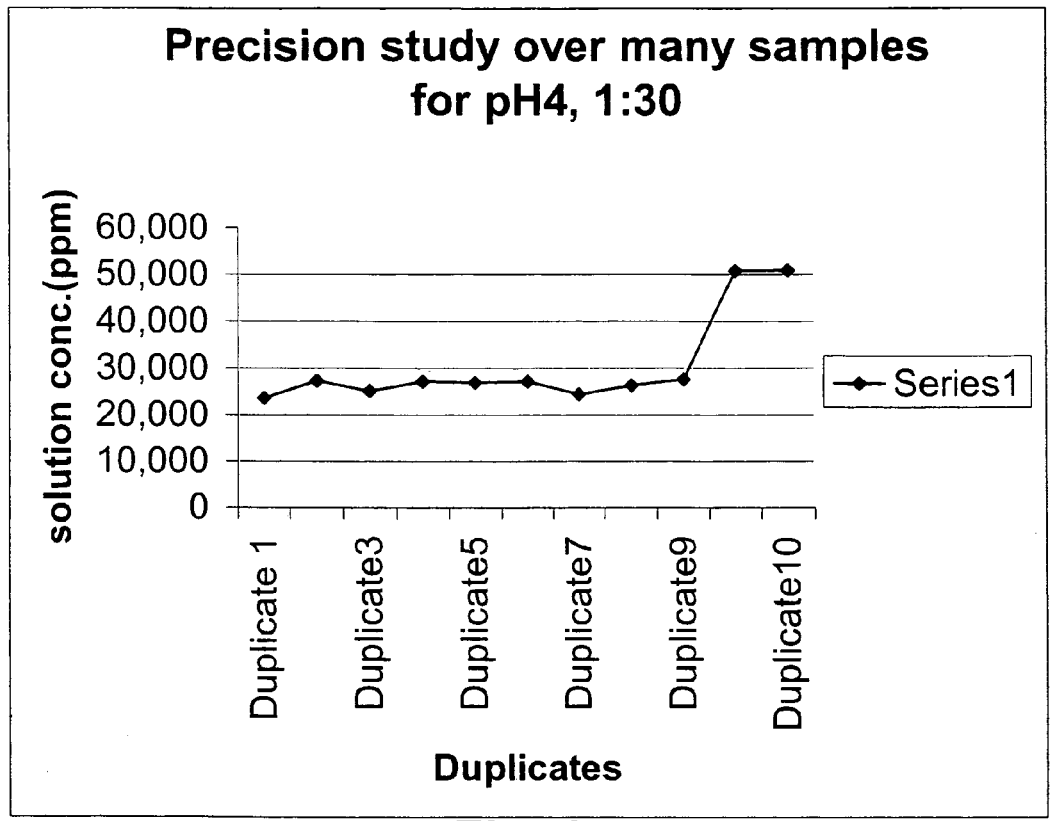
FIG. 4 graphically depicts the results of a precision study for many samples at a uranyl:borax molar ratio of 1:30 and pH 4.

ICP of the supernatants were taken by standard examination of water and waste water method 3120 (Standard Methods for the Examination of Water and Wastewater, 20th Edition, Method 3210B) over a period of 4 weeks. The samples were digested with 2% $HNO_3$ acid. For the sake of consistency, 4 identical samples were prepared for every condition (ratio and pH). The uranium content of one sample from a given condition (ratio and pH) was tested every week over a period of 4 weeks. To prove the precision of our results, method duplicates were prepared for pH 4, 1:20. To confirm the precision of our samples, a precision study was performed by making up two sample duplicates for every condition (ratio and pH). In addition, 10 duplicates were made up for pH 4, 1:30 to show precision over many samples. Uranium concentration in the supernatants for uranyl:borax ratios of 1:20 and 1:30 are presented in FIGS. 2 and 3. Results for each uranyl:borax ratio of 1:30 at pH 4 are illustrated in FIG. 4.

B. Time-Dependent Study of the Pellets

Figure 5:
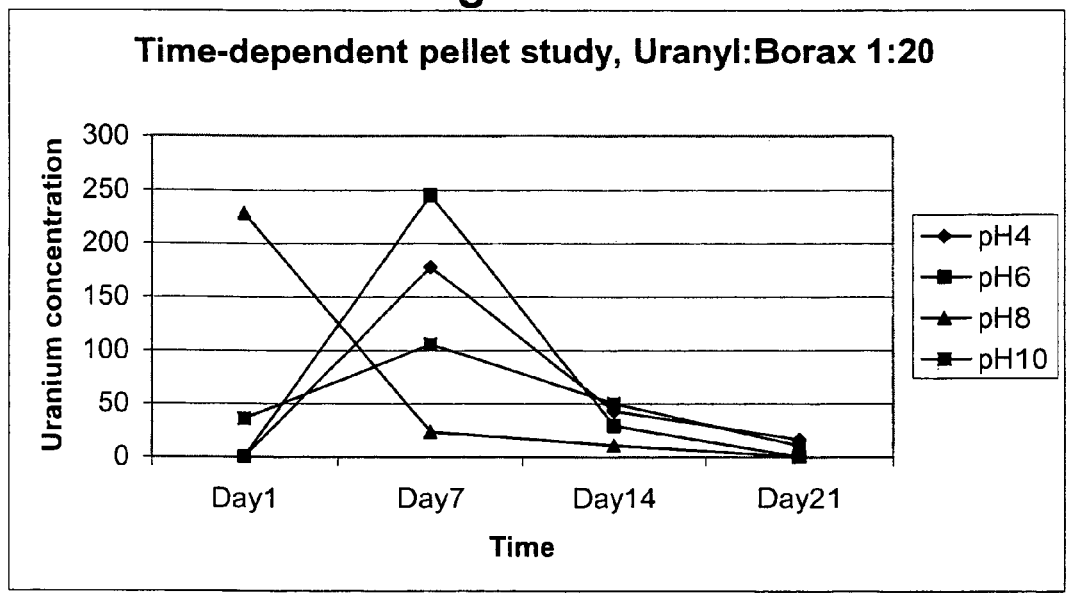
FIG. 5 graphically depicts uranium concentration in a pellet over time at a uranyl:borax molar ratio of 1:20 and various pH values.
Figure 6:
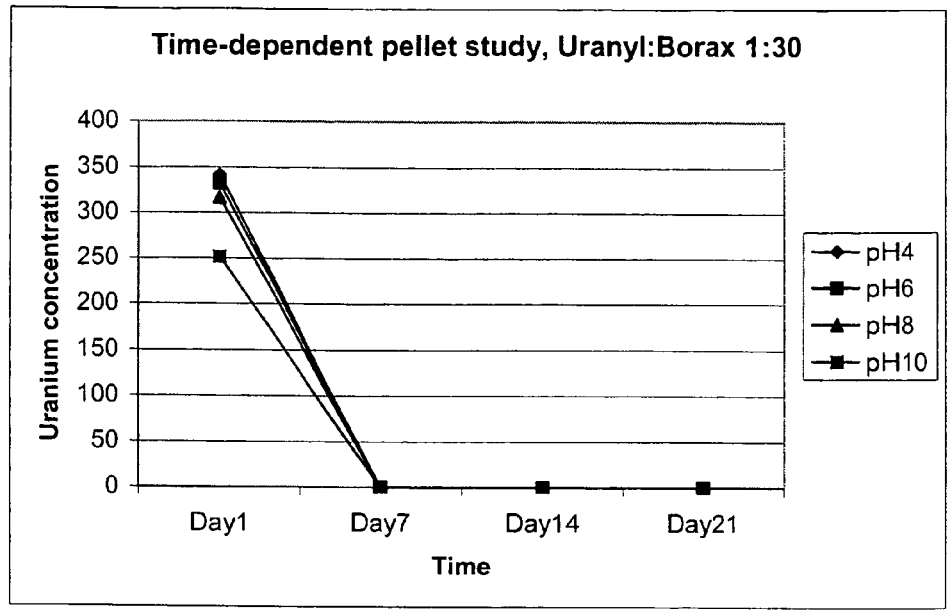
FIG. 6 graphically depicts uranyl dication concentration in a pellet over time at a uranyl:borax molar ratio of 1:30 and various pH values.

A 0.00957 M stock solution was prepared by dissolving 2.03 g of $UO_2(CH_3COO)_2$ in 500 mL of water. 10 mL aliquots of the stock solution were pipetted out with a 10 mL volumetric pipette. The pH of the solutions were adjusted with 1M NaOH solution and then made up to 25 mL in a volumetric flask. The four pH conditions selected for the study were 4, 6, 8, and 10. Subsequently, the 25 mL solutions were taken in sample vials and 40 mL of 0.0478M [uranyl acetate:borax in a 1:20 ratio] and 40 mL of 0.0718M [uranyl acetate:borax in a 1:30 ratio] were added to the respective sample vials. All samples were centrifuged at 1500 G/2840 r.p.m. at 22° C. for 10 mins. The supernatants were decanted off into new centrifuge tubes and the pellets were redissolved in 1% $HNO_3$ and taken up in digestion tubes. ICP of the solutions of the pellets were obtained by examination using water and waste water ICP method 3120. The samples were digested with 2% $HNO_3$ acid. Meanwhile, the supernatants were allowed to stand undisturbed for one week, centrifuged and the above process repeated. In this way, the pellets were studied over a period of 4 weeks. The results of the time-dependent pellet study for a uranyl:borax ratio of 1:20 are presented in FIG. 5. Results for a uranyl:borax ratio of 1:30 are presented in FIG. 6.

C. Leaching Study Summary

Summarizing the leaching studies, uranium precipitate leaching was evaluated for uranyl:borax ratios of 1:20 and 1:30, at pH 4, 6, 8, and 10. Four identical samples were prepared for each ratio and at each pH. The uranium content of one sample for a given ratio and pH was tested every week over a period of 4 weeks. To prove the accuracy of the results, method duplicates were prepared for pH 4, 1:20 ratio uranyl:borax. To confirm precision, a precision study was performed by preparing two sample duplicates for every tested condition of ratio and pH, and 10 duplicates were prepared for pH 4, uranyl:borax 1:30. The digestion step referred to above was completed to ensure that all the uranium was dissolved. The centrifugation step was performed more slowly than in the concentration-dependent study to simulate the effects of gravity over time, rather than forced precipitation.

Figure 7:
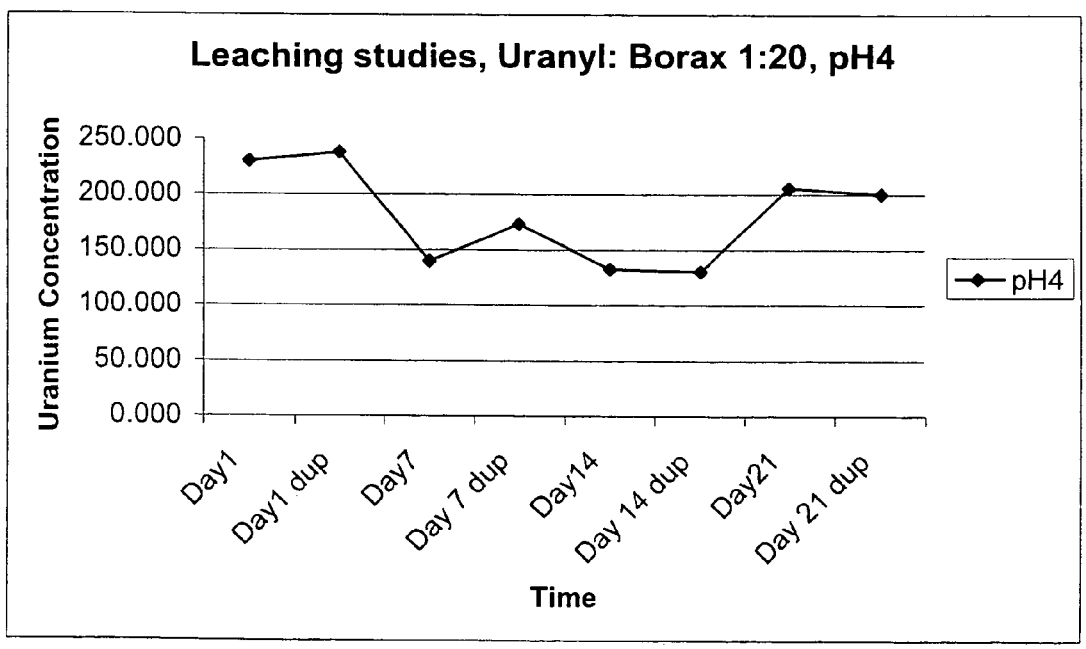
FIG. 7 graphically shows leaching of uranyl dication after addition of borax at a uranyl:borax molar ratio of 1:20, at various pH values.
Figure 8:
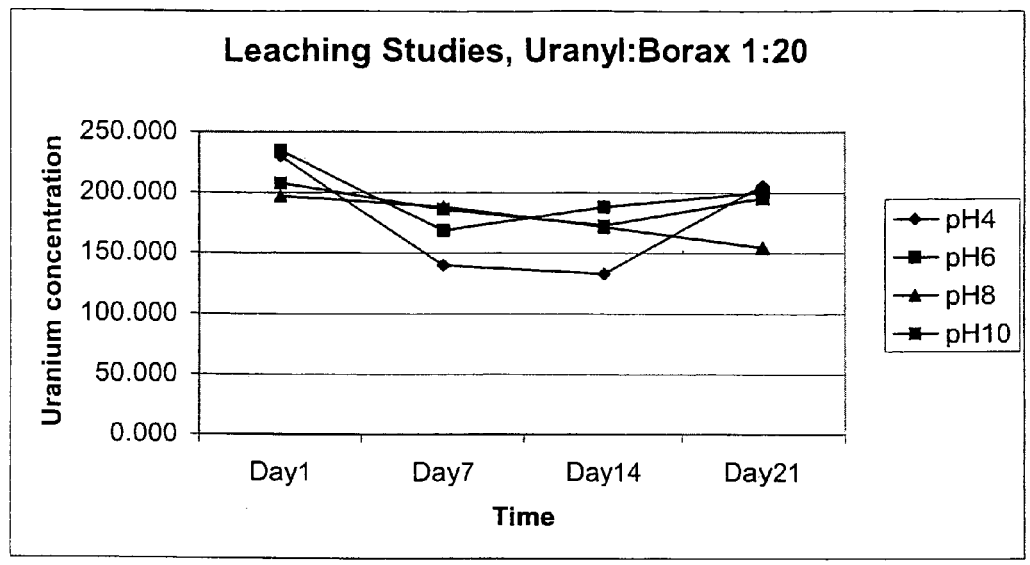
FIG. 8 graphically shows leaching of uranyl dication after addition of borax at a uranyl:borax molar ratio of 1:20, at pH 4.
Figure 9:
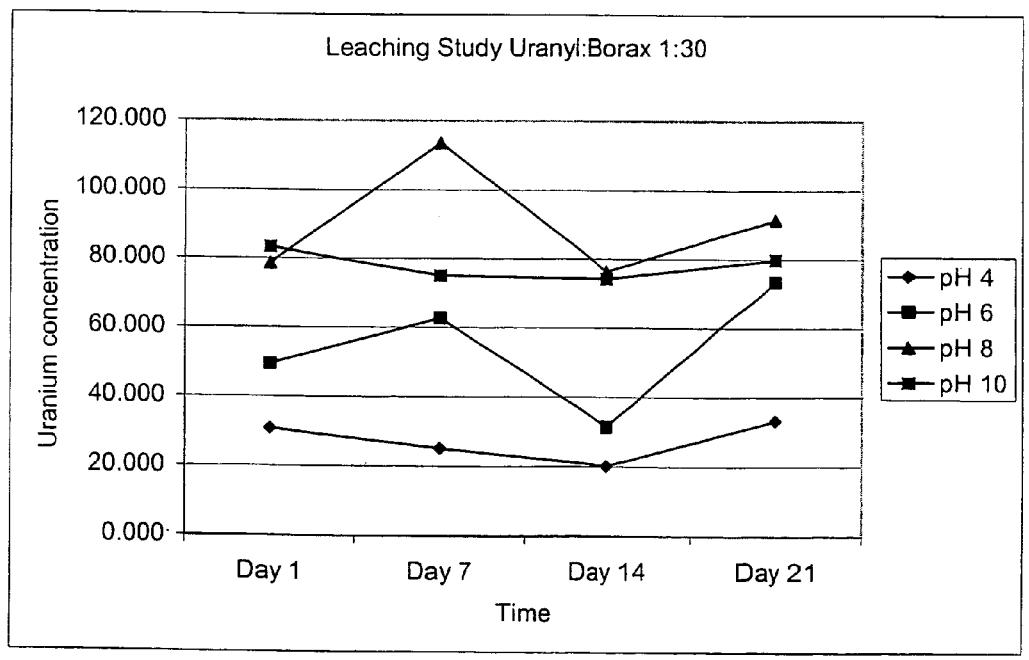
FIG. 9 graphically shows leaching of uranyl dication after addition of borax at a uranyl:borax molar ratio of 1:30, at pH 4.

The results of the leaching studies for a uranyl:borax ratio of 1:20 at pH 4 are presented in FIG. 7. The results for uranyl:borax at 1:20 for all pH values tested are in FIG. 8. Results for uranyl:borax of 1:30 are in FIG. 9. All these results illustrate that uranium is not leached from the precipitates over the course of a month, indicating that the precipitates do not change, to release uranium, with time. This represents irreversible uranium binding by the boron additive.

EXAMPLE 5

Figure 10:
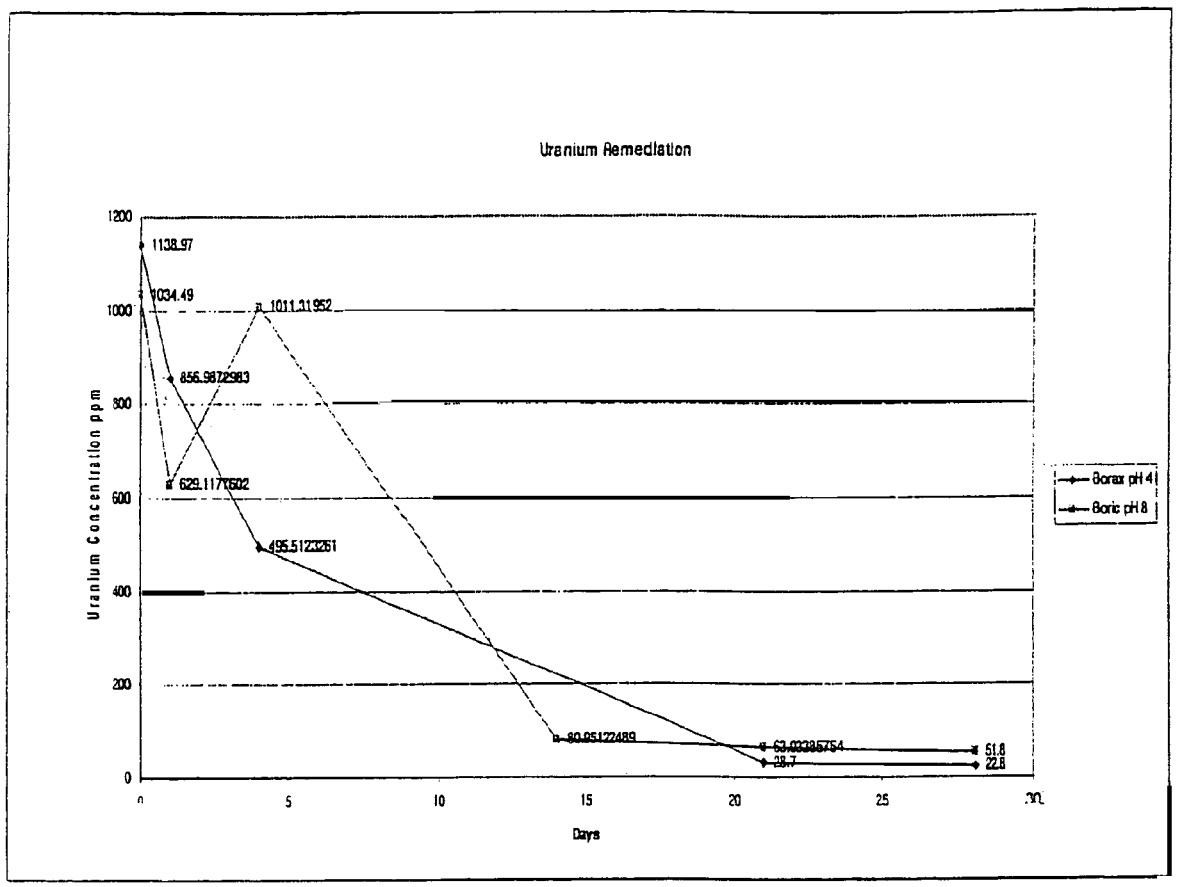
FIG. 10 graphically depicts precipitation of uranyl dication from water by borax (pH 4) and boric acid (pH 8).

Studies were undertaken to compare the ability of two boron reagents (borax and boric acid) to precipitate uranyl dication from water. Samples of uranium-contaminated water (uranium oxyacetate) at about 1000 ppm) were prepared. Equi-molar solutions of uranyl:boron reagent were prepared and evaluated for uranium precipitation over time. Each boron reagent was evaluated at pH 4, 8, and 10 (see Table 5). Uranium precipitation over a 30 day period for water samples treated with borax (pH 4) and boric acid (pH 8) are presented in FIG. 10. It can be seen that water samples were substantially remediated, i.e., substantial amounts of uranyl dication were removed, by day 15 after addition of boron reagents.

In summary, numerous benefits result from employing the concepts of the present invention. Specifically, boron reagents are usable in situ and provide a quick and inexpensive means to remediate aqueous uranium contamination. The exceptionally strong lattice energy resulting from the attraction between the uranyl dication ion and the boron dianions causes the resulting compound to be extremely insoluble and relatively impervious to leaching. Thus, the uranium is bound in place and is no longer free to travel in the water table. Advantageously, because the precipitates formed using the present method are stable and highly resistant to leaching over time, they may be either physically removed from the water source or left in place after binding.

The foregoing description of the invention has been presented for purposes of illustration and description. It is not intended to be exhaustive or to limit the invention to the precise form disclosed. Obvious modifications or variations are possible in light of the above teachings. All such modifications and variations are within the scope of the invention as determined by the appended claims when interpreted in accordance with the breadth to which they are fairly, legally and equitably entitled.

The invention claimed is:

1. A method of precipitating uranium from water, comprising:

TABLE 5

Precipitation of uranium from water by borax and boric acid

| Time | Sample | Drop | Addition | Dilution | ICP (ppm) | Concentration |
|---|---|---|---|---|---|---|
| 0 | Borax 4 | | | | | 1138.97 |
| 0 | Borax 8 | | | | | 1034.49 |
| 0 | Borax 10 | | | | | 1026.09 |
| 0 | Boric 4 | | | | | 1138.97 |
| 0 | Boric 8 | | | | | 1034.49 |
| 0 | Boric 10 | | | | | 1026.09 |
| 1 | Borax 4 | .1029 | 10.3381 | 100.467441 | 8.53 | 856.9872983 |
| 1 | Borax 8 | .0997 | 9.9821 | 100.1213641 | 7.63 | 763.926008 |
| 1 | Borax 10 | .1134 | 11.2911 | 99.56878307 | 7.52 | 748.7572487 |
| 1 | Boric 4 | .1119 | 11.1572 | 99.70688114 | 7.48 | 745.807471 |
| 1 | Boric 8 | .1009 | 10.0123 | 99.22993062 | 6.34 | 629.1177602 |
| 1 | Boric 10 | .1058 | 10.6299 | 100.4716446 | 9.59 | 963.5230718 |
| 4 | Borax 4 | .1251 | 12.4977 | 99.90167866 | 4.96 | 495.5123261 |
| 4 | Borax 8 | .1019 | 10.2103 | 100.1992149 | 10.8 | 1082.151521 |
| 4 | Borax 10 | .0998 | 9.9744 | 99.94388778 | 12.7 | 1269.287375 |
| 4 | Boric 4 | .1098 | 10.1184 | 92.15300546 | 11.4 | 1050.544262 |
| 4 | Boric 8 | .0917 | 9.2738 | 101.131952 | 10 | 1011.31952 |
| 4 | Boric 10 | .1156 | 11.5003 | 99.48356401 | 11.4 | 1134.11263 |
| 14 | Borax 4 | .0967 | 9.6599 | 99.89555326 | .061 | 6.093628749 |
| 14 | Borax 4D | .0955 | 9.4994 | 99.47015707 | .037 | 3.680395812 |
| 14 | Borax 4S | .0932 | 8.8915 | 95.40236052 | 5.31 | 506.5865343 |
| 14 | Borax 8 | .1106 | 11.0043 | 99.49638336 | 9.52 | 947.2055696 |
| 14 | Borax 10 | .1197 | 11.9631 | 99.94235589 | 7.28 | 727.5803509 |
| 14 | Boric 4 | .0918 | 9.1806 | 100.0065359 | 8.8 | 880.0575163 |
| 14 | Boric 8 | .0916 | 9.1658 | 100.0633188 | .809 | 80.95122489 |
| 14 | Boric 10 | .0931 | 9.3384 | 100.3050483 | 8.96 | 898.7332331 |
| 21 | Borax 4 | 1 | 1 | 1 | 28.7 | 28.7 |
| 21 | Borax 8 | .3413 | 16.9584 | 49.68766481 | 20.5 | 1018.597129 |
| 21 | Borax 8D | .3406 | 17.0126 | 49.94891368 | 19.5 | 974.0038168 |
| 21 | Borax 8S | .3405 | 16.9991 | 49.92393539 | 24.7 | 1233.121204 |
| 21 | Borax 10 | .3258 | 16.9956 | 52.16574586 | 19.3 | 1006.798895 |
| 21 | Boric 4 | .3331 | 17.0291 | 51.12308616 | 19.9 | 1017.349415 |
| 21 | Boric 8 | .3243 | 17.0349 | 52.52821462 | 1.2 | 63.03385754 |
| 21 | Boric 10 | .3119 | 15.6314 | 50.11670407 | 18.5 | 927.1590253 |
| 28 | Borax 4 | 1 | 1 | 1 | 22.8 | 22.8 |
| 28 | Borax 8 | .316 | 17.2018 | 54.43607595 | 15.4 | 838.3155696 |
| 28 | Borax 10 | .295 | 15.0696 | 51.08338983 | 19.1 | 975.6927458 |
| 28 | Boric 4 | .3057 | 14.9778 | 48.99509323 | 20.4 | 999.4999019 |
| 28 | Boric 8 | 1 | 1 | 1 | 51.8 | 51.8 |
| 28 | Boric 10 | .3042 | 15.2337 | 50.07790927 | 16.6 | 831.2932939 | mixing a boron reagent with water containing $[UO_2]^{2+}$ to bind said $[UO_2]^{2+}$ and to form a precipitate; and precipitating uranium from said water.

2. The method of claim 1 including using borax as said boron reagent.

3. The method of claim 2 further including adjusting pH of said contaminated water to about pH 4.

4. The method of claim 1, including using boric acid as said boron reagent.

5. The method of claim 4, further including adjusting pH of said contaminated water to about pH 8.

6. The method of claim 1 including using a mixture of borax and boric acid as said boron reagent.

7. The method of claim 1, further including adding a surfactant to said contaminated water.

8. A method of removing uranium from contaminated groundwater, comprising:

adding a boron reagent to said contaminated groundwater to bind and form a precipitate of said uranium from said groundwater; and collecting said precipitated uranium for safe disposal.

9. The method of claim 8 further including adjusting pH of said contaminated groundwater in order to promote precipitation of uranium from said contaminated groundwater.

10. The method of claim 9 including adding a surfactant to said contaminated groundwater in order to increase rate of precipitation of uranium therefrom.

11. A method of precipitating uranium from contaminated groundwater comprising:

adding a boron reagent to said contaminated groundwater to bind and form a precipitate of said uranium from said groundwater; and leaving the precipitated uranium in place.

12. The method of claim 11 including using borax as said boron reagent.

13. The method of claim 12 further including adjusting pH of said contaminated water to about pH 4.

14. The method of claim 11, including using boric acid as said boron reagent.

15. The method of claim 14, further including adjusting pH of said contaminated water to about pH 8.

16. The method of claim 11 including using a mixture of borax and boric acid as said boron reagent.

17. The method of claim 11, further including adding a surfactant to said contaminated water.

* * * * *